United States Patent
Barton et al.

(10) Patent No.: US 12,225,053 B2
(45) Date of Patent: Feb. 11, 2025

(54) METHOD FOR IMPLEMENTING CLOUD-BASED SECURITY PROTOCOLS FOR A USER DEVICE

(71) Applicant: Cisco Technology, Inc., San Jose, CA (US)

(72) Inventors: Robert Edgar Barton, Richmond (CA); Jerome Henry, Pittsboro, NC (US); Indermeet Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 17/898,162

(22) Filed: Aug. 29, 2022

(65) Prior Publication Data
US 2024/0073248 A1 Feb. 29, 2024

(51) Int. Cl.
*H04L 9/40* (2022.01)
(52) U.S. Cl.
CPC .................................. *H04L 63/20* (2013.01)
(58) Field of Classification Search
CPC .. G06F 3/165; G05B 15/02; H04N 21/41407; H04N 21/43637; H04N 21/44209; H04N 21/44227; H04N 21/8113; H04R 2227/005
See application file for complete search history.

(56) References Cited

U.S. PATENT DOCUMENTS

| | | |
|---|---|---|
| 2017/0201549 A1 | 7/2017 | Vincent et al. |
| 2017/0230467 A1* | 8/2017 | Salgueiro ............ H04L 41/0893 |
| 2018/0205611 A1* | 7/2018 | Gibson ................ H04L 67/535 |
| 2020/0128046 A1 | 4/2020 | Schaefer et al. |
| 2020/0204551 A1* | 6/2020 | Singh .................. H04L 63/0218 |
| 2021/0037057 A1* | 2/2021 | Suleman ............. H04L 63/0272 |
| 2022/0086169 A1 | 3/2022 | Kumar et al. |
| 2023/0156826 A1* | 5/2023 | Palermo .............. H04W 40/248 370/329 |
| 2024/0064147 A1* | 2/2024 | Jain ........................ H04L 63/20 |

* cited by examiner

*Primary Examiner* — Sm A Rahman
(74) *Attorney, Agent, or Firm* — Lee & Hayes, P.C.

(57) ABSTRACT

A method and system for implementing security policies for a user device based on one or more user device parameters. When a user device joins a domain, the security policy agent determines one or more security policies for the user device based on one or more parameters of the user device. The user parameters may include the type of user device, a user group, an application to be used, etc. The security polies are sent to the user device. The user device generates a data packet having metadata indicating the one or more device parameters. The data packet is sent to a remote security service where security policies are implemented based on the metadata.

20 Claims, 9 Drawing Sheets

METHOD FOR IMPLEMENTING CLOUD-BASED SECURITY PROTOCOLS FOR A USER DEVICE

TECHNICAL FIELD

The present disclosure relates generally to techniques for determining and implementing specific security protocols for use by a user device in a cloud-based software environment.

BACKGROUND

Computer network systems have experienced an ever increasing need to process and store vast amounts of data. In order to manage these vast amounts of data some network environments such as enterprise networks have implemented edge computing network systems wherein various computer devices of an enterprise network store and process data locally and transfer data with devices that are in close proximity with one another. Such network environments create challenges with regard to maintaining a desired amount of security. In order to ensure appropriate levels of security some enterprise networks employ cloud-based security services such as Secure Access Service Edge (SASE) services.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various technologies for implementing cloud-based security protocols for a user device based on one or more parameters of the user device. A method according to an embodiment includes, receiving one or more security polies from a security policy agent, the one or more security policies including specific security service requirements based on one or more user parameters. Metadata indicative of the one or more security policies is attached to a data packet, and the data packet is sent to a cloud-based software service.

In one embodiment, the user parameters can include one or more of, the user device, user group, or application. In one embodiment, the cloud-based software service can be a Secure Access Service Edge (SASE) provider. In one embodiment, the security policy agent can be operated within a common enterprise network with the user device and can push security policy data to the user device.

In one embodiment, the metadata indicative of the one or more security policies comprises a header including one or more labels attached to the data packet. The header labels can be removed individually as each security protocol is implemented. In one embodiment, the one or more security policies can be generated via one or more of a Group Policy Object (GP) or Master Data Management (MDM) policy.

Additionally, the techniques described herein may be performed as a method and/or by a system having non-transitory computer-readable media storing computer-executable instructions that, when executed by one or more processors, performs the techniques described above.

EXAMPLE EMBODIMENTS

Edge Computing

Edge computing is a distributed information technology architecture in which client data is processed at the periphery of a network (such as an enterprise network), as close to the originating source as possible. Data storage, use, and transmission has become increasingly important to businesses, and other computer system users. As a result, businesses and computer networks must process and transport vast, ever increasing amounts of data. This need to process and transport such large amounts of data derives not only from use of computers, but also from the increasing use of Internet of Things (IoT). Devices such as smart factories, smart or self-driving vehicles, modern factories, etc. can all require data such as from various sensors device controls, etc. to be processed, stored, and transported.

This flood of data has changed the way in which enterprises handle computing and data. A more traditional computing paradigm which involved the use of a centralized data center with access to the interact is not an optimal system for these growing rivers of real-world data. Bandwidth limitations, latency issues and unpredictable network disruptions make the use of such centralized computer architectures impractical. Businesses can respond to such challenges through the use of edge computing.

An edge computing environment moves much of the storage and computation resources away from the central data center and closer to the source of the data itself. Rather than transmitting all raw data to a central data center for processing and analysis, that work can instead be performed closer to where the data is actually gathered or produced.

Examples could include, for example, data gathered at a retail store, a factory floor, a sprawling utility system, or a fleet of autonomous vehicles. Gathering and processing the data close to the source of the data, such as at an individual autonomous vehicle of a fleet of vehicles, allows less data to be transmitted long distances to a central data center, thereby greatly reducing the data transmission challenges of gathering and processing such large amounts of data.

However, the use of such an edge computing environment also requires individual, remote computing devices to function more autonomously than would be the case in a more centralized data processing system. Each individual entity might have a need to access cloud-based software and transmit data between other local devices. Rather than having a central data center handling and ensuring security of the system, each computing entity in the enterprise must be responsible for its own security. One way to provide such security in an edge-based system is to employ Secure Access Service Edge (SASE) protocols.

Secure Access Service Edge (SASE)

Secure Access Service Edge (SASE) is a cloud-based enterprise security framework designed to address the network and security challenges caused by digital business transformation such as edge computing environments. The move to cloud services coupled with the increasingly mobile workforce puts users, devices, applications, and data outside of the enterprise data center and network, increasing the need for security services that can meet the needs of such an environment. SASE responds to this need by delivering networking and network security controls at the edge, as close to the users as possible.

SASE delivers converged network and security services from a single, globally distributed and cloud-native platform. Scale, acceleration, and edge computing capabilities to meet customer needs are integrated with various security systems and software such as, Zero-Trust Network Access (ZTNA), web application and API protection as a service (WAAPaaS), and cloud secure web gateway (SWG), services to protect an enterprise and individual user.

SASE provides the ability to offer cloud-based security services to many different users, including remote office environments, individual users, Internet of Things (IoT) devices, enterprise system, etc. Often a company will implement SASE services such that all traffic from a user's device or network branch (such as via SD-WAN) terminates in the SASE cloud, and the virtualized security services are applied to the incoming session.

SASE cloud services continue to offer more services as well as enhanced and improved customer/provider interaction. Examples of services that can be provided through a SASE service can include, Cloud Access Security Broker (CASB), Data Loss Prevention (DLP), Remote Browser Isolation (RBI), Secure Web Gateway (SWG), Next Generation Firewall (NGFW), as well as others. However, depending upon the device, the user, or the application that is involved, different SASE services may be required. For example, there may be certain devices or applications used by a device or user that may be considered extremely sensitive, such as for example cloud-based health care applications where personal medical information may be shared. On the other hand, other applications such as virtual meeting software such as WebEx®, may not be as privacy sensitive and will, therefore, not require the full suite of security services.

However, in spite of the varying security needs of a user or user group in an enterprise network, many computing environments apply a one size fits all security approach. For example, in an enterprise environment, a fixed suite of security services may be applied to all users within that enterprise regardless of the specific need of a user in a particular situation. This can lead to unnecessary security features being deployed, in a given situation, or even worse, insufficient security robustness for some user applications, devices or situations.

An enterprise group security policy protocol such as a group policy object (GPO) or other type of Master Data Management (MDM) policy system can be used to set security protocol for each of the many different computing devices of an enterprise. Although the term "Group Policy" or "Group Policy Object" is used herein to describe various embodiments, this is by way of clarity, as the described embodiment can apply to any type of security management or MDM policy.

Group Policy Objects allow central policy control over how a device and application are used on an endpoint by a particular user device. Group Policy can be used to set the QoS, DSCP values on an application on a device, which applications may be opened by the device, as well as many other security settings or protocols. Because of such Group Policy and other MDM policy services, centralized control can be achieved over what users and devices can do with applications. However, such a security protocol sets a one-size-fits-all approach to a vast array of different devices, users, and applications. This approach may be less than ideal for many applications, since not all security needs are the same for all user parameters and situations.

The described embodiments provide technologies for differentiating and customizing security services in a SASE environment, which in some embodiments can be based on a Group Policy Object (GPO). Some embodiments can include a Group Policy extension that allows an administrator to do define which SASE security services (from a suite of such possible services) should be implemented for a particular application, user, device or combination of these or other parameters.

In one embodiment, a Group Policy Object or other MDM policy can embed metadata, such as a header, directly into a data packet such as might be generated by a particular user device of an enterprise. This metadata can indicate which SASE security services are required by the particular user device in a particular situation. As the data packet accesses each of the particular security services indicated by the metadata (e.g. header), the particular associated metadata can be removed "popped off".

To implement this, an administrator determines which individual security services from a suite of SASE security services are required for a particular set of user parameters. Through a selector mechanism, the SASE security services can be selected and attached to the Group Policy Object (GOP), or other Master Data Management (MDM) policy system. By way of example, a particular use parameter could include users in a particular clinical user group, or a particular type of user device. In one particular embodiment, a particular user parameter could include a user device using a healthcare application such as CERNER or EPIC, in which case security services could include DLP, NGFW, AND SWG. For other apps on the same device, only NGFW might be required.

After determining which services are needed for a particular set of user parameters, the GPO or other MDM policy object is pushed to all devices and user devices in the domain. When the policy object is implemented on the end device it becomes active. The Group Policy Object can identify when certain user parameters have been met. For example, the GPO can determine when a certain application is being used, by whom, and any other criteria of the policy. When an application that matches the policy object is identified, it triggers which security services will be applied by the cloud-based SASE service when the flow arrives in the cloud.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
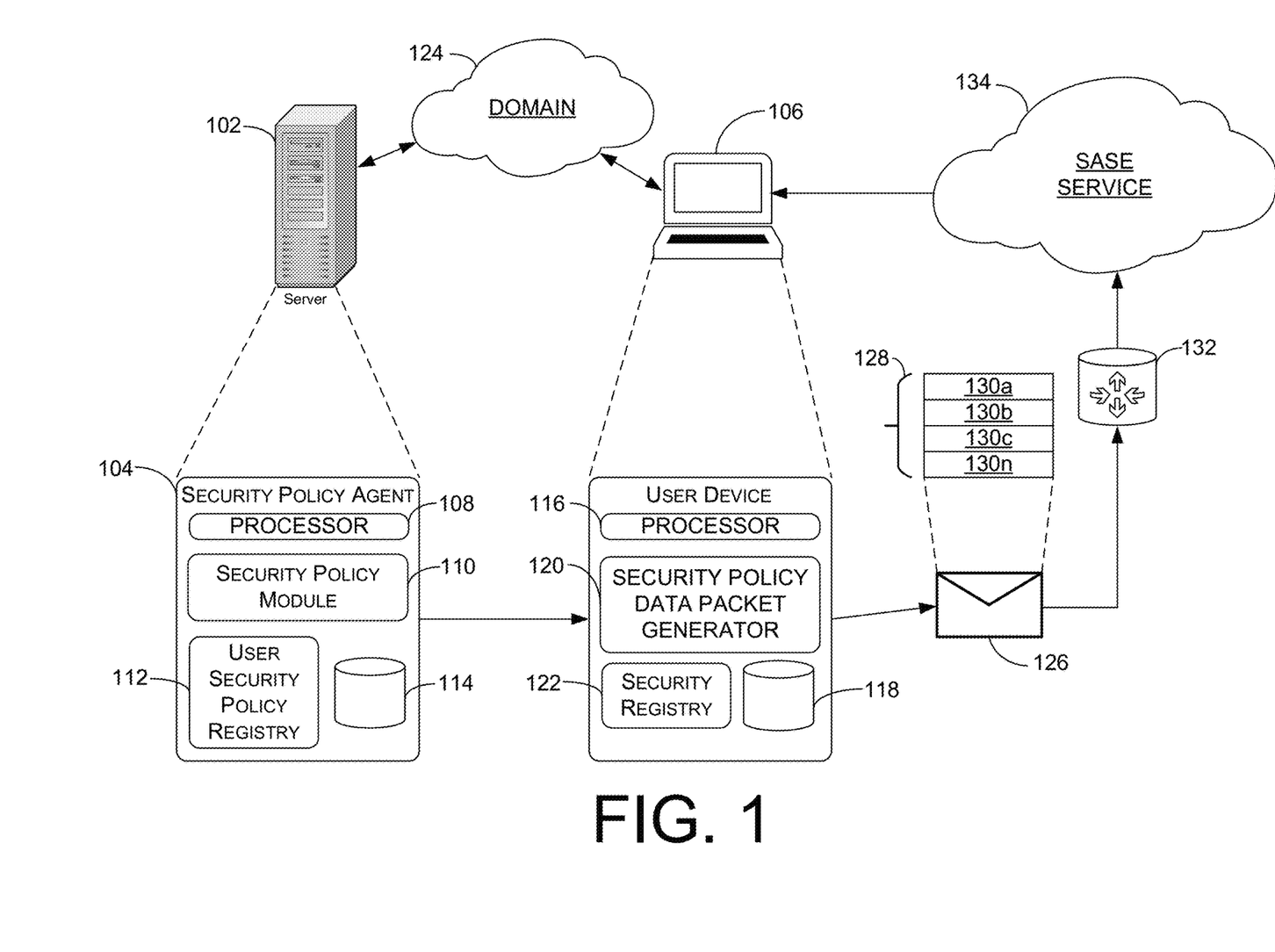
FIG. 1 is a schematic illustration of a computer device including a security policy agent module in communication with a user computer device having a module for generating a security policy data packet.

FIG. 1 is a schematic illustration of a computer device 102. The computer device 102 can include circuitry, memory and or software that can provide a security policy agent module 104. The computer device 102 can be, for example, a computer server, desktop computer, mainframe computer, etc. The computer device can be in direct or indirect communication with a user device 106. The user device 106 can be, for example, a desktop computer, lap-top computer, cell phone, network connected appliance or some other computer device.

The security policy agent 104, may include a processor 108, a security policy module 110, a user security policy registry 112 and computer storage or memory 114, in one embodiment, the user device 106 can include a processor 116 and computer storage or memory 118. The user device 106 can also include a security policy data packet generator module 120 and a security registry 122.

The user device 106 can be in communication with a computer network such as a domain 124. When the user device 106 enters the domain 124, the computer device 102 activates the security policy agent 104. The security policy module 110 utilizes the processor 108 to determine a set of user parameters of the user device 106. The user parameters can include, but are not limited to: user device type; user group; application, etc. For example, a determination of the user device type could include a determination of whether the user device is a desktop computer; laptop computer, cell phone, notebook, etc. The user device type may even include information as to a particular brand or model of computer device. The user group may include a determination of whether the user device 106 is being used in association with a particular user group requiring special security services. For example, the user device 106 may be accessing the domain 124 in association with a user group that includes a medical group requiring special security protocols or protections or a banking group, payroll, etc. each of which may require specific security and/or data protections. Similarly, a user device application could include a computer software or other application associated with banking, medical records payroll, etc. that may require unique security protocols. These are by way of example, however, as other types of user device parameters may be contemplated.

Based on the determined list of user parameters, the security policy module 110 can implement the processor 108 to determine a set of security policies required by the user device 106. In one embodiment, the security policies can be based upon an enterprise-wide Group Policy Agent (GPO) or Master Data Management (MDM) policy protocol.

In one embodiment, once the required set of security policies has been determined for the user device 106 based on the user device parameters, the set of required security polices can be entered into a user security policy registry 112, which may be stored in the computer memory or storage 114.

The security policy agent 104 can then send this list of specific, required user device security policies to the user device 106. The user device 106 can access the security policy data packet generator 120 to generate a data packet 126. The user device 106 can also add the particular security policy requirements into the security policy registry 122. The security policy registry 122 can be stored in the computer memory or storage 118.

The data packet can include a header 128, indicating the security policies to be implemented based on the security policy requirements received from the security policy agent 104. The header 128 can include a label stack including individual labels 130a-n. Each label 130 is associated with a particular security service to be implemented by the user device 106. The data packet can be sent, for example through one or more routers or switches 132 or across a network to a remote security service 134. In one embodiment, the security service 134 can be a distributed cloud-based security service. In one embodiment, the security service 134 can be a Secure Access Service Edge (SASE) security service.

The security service 134 can include a suite of different security services. The security service 134 implements individual security services based on the labels 130 of the data packet header 128. In one embodiment, each label 130 can be extracted or removed as each associated security service is implemented, as will be described in greater detail herein below. The selected security services can then be applied to the user device 106 to provide a selected set of security services based on the particular user parameters.

Figure 2:
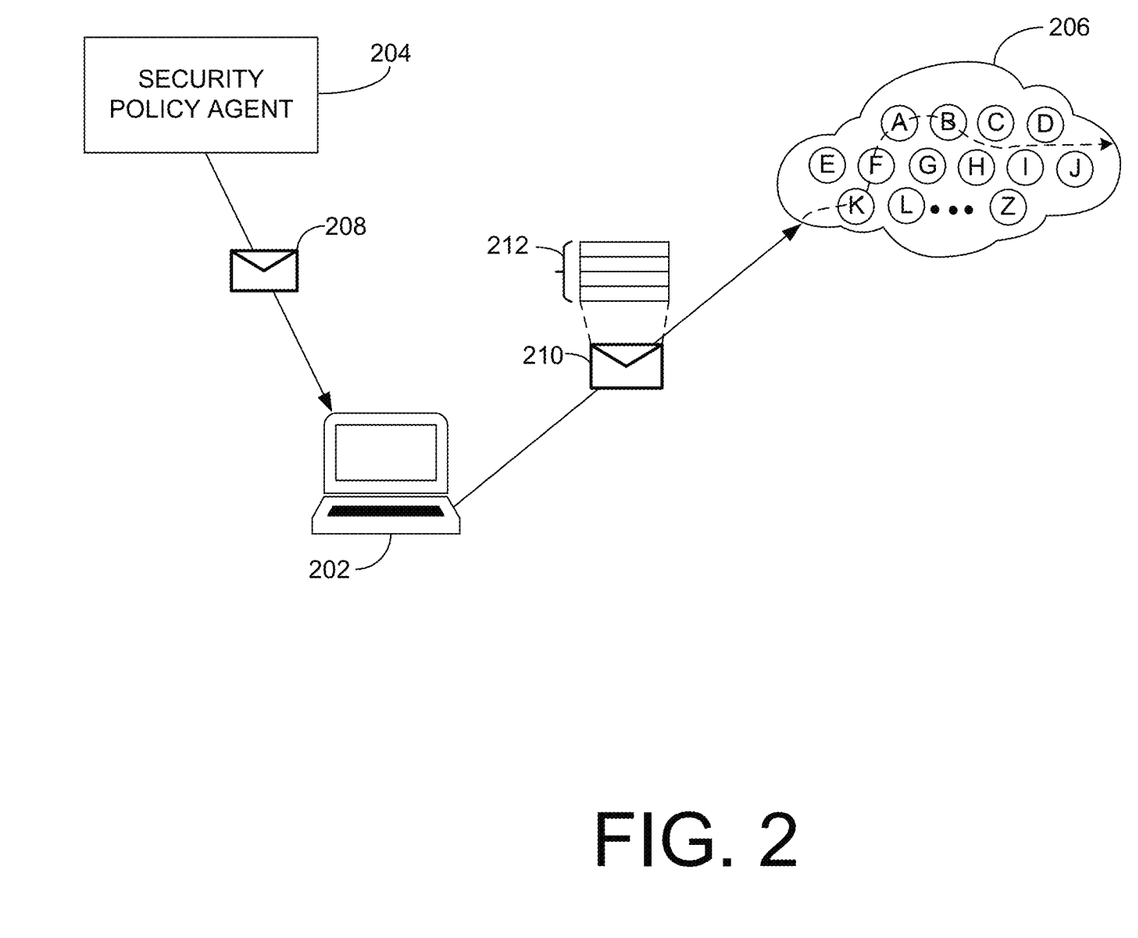
FIG. 2 is a schematic illustration of a user device accessing selected security services from a cloud-based security system based on one or more user parameters.

FIG. 2 illustrates a user device 202, a security policy agent 204, and a cloud-based suite of security services 206. The security policy agent 204 includes circuitry and/or software that can determine a security policy that can be based on various user parameters as described above. For example, the user parameters can include: (1) the user device (e.g. computer type, cell phone, internet of things (iOT) device, or other device); (2) a user group; (3) a user application to be used, etc. By way of example, if the user device is part of a medical group and is using a medical service related application, the applicable security policy can include specific security services that can apply particularly to safeguarding a patient's personal medical information. The security policy can be based on or derived from a group policy object (GPO) Master Data Management (MDM) policy or other such security policy protocol.

The determined security policies 208 can be sent, (i.e. pushed) to the user device 202 when the user device 202 joins a domain, such as an enterprise system, which will be further described herein below. The user device receives the security policy 108 and can thereby determine what security policies are needed for a particular set of user parameters.

Based on the security policy 208, the user device generates a data packet 210 that can include certain metadata 212 indicating which security services are required for the particular set of user parameters. This data packet 210, can then be sent to the cloud-based suite of security services 206 to apply the needed security services. For example, as shown in FIG. 2, the data packet applies security services K, F, A, B.

In one embodiment, the metadata 212 applied to the data packet 210, can include IP headers having a label stack that indicates particular service chain requirements. In one embodiment, the individual headers can each be removed as each associated security service is applied. In one embodiment, the suite of security services 206 can be a Secure Access Service Edge (SASE) service. In one embodiment, the security services A . . . Z of the security service suite 206 can include for example: Thousand Eyes®; Secure Web Gateway (SWG); Domain Name System (DNS); Next Generation Firewall (NGFW); Cloud Access Security Broker (CASB); Remote Browser Isolation (RBI); Data Loss Prevention (DLP); Zero Trust Network Access (ZTNA); Virtual Private Network (VPN); Software-Defined Wide Area Network (SD-WAN); etc. This is merely by way of example however, as the particular available security services could include other available or yet to be developed security services.

Figure 3:
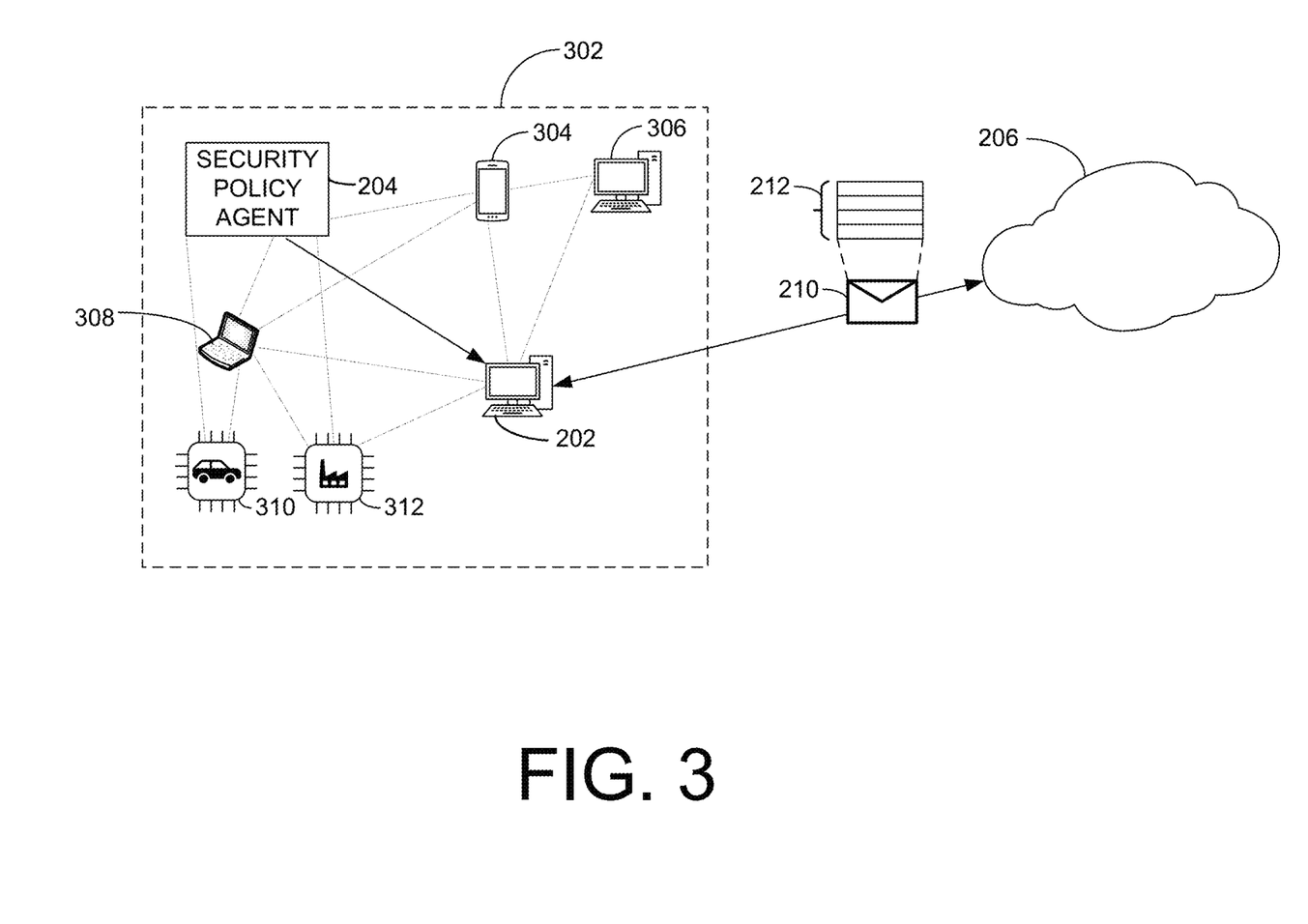
FIG. 3 is a schematic illustration of an enterprise computer system in an edge computing environment accessing selected security services from a plurality of cloud-based security services based on one or more user parameters.

FIG. 3 illustrates the user device 202 employed in an enterprise networking environment 302, which can also be employed in an edge network architecture. The enterprise network 302 can be associated and implemented within various types of organizations such as a business, government entity utility grid, etc. The enterprise network 302 can include various types of vastly different user devices such as, but not limited to desktop computers 306 mobile devices 304 such as cell phones, laptop computers 308, as well as internet of things (IoT) devices such as autonomous vehicles 310 smart factories 312, as well as many other possible devices.

As discussed above, an edge network architecture allows various user devices of the network 302 to operate somewhat more independently than would be the case in a central processing architecture. The various devices 202, 204 304-312 of the enterprise network 302 can process and store data locally and can also transfer data directly between other devices that may be close to one another in order to limit the transfer of data over long network paths. This helps to increase the speed and efficiency of data transfer needed for different devices to perform their desired tasks. However, this architecture can also effect security demands for the safe and efficient operation of the various devices of the network 302.

As discussed above, the group policy agent 204 can determine specific security policies for each of the various devices 202, 304-312 of the network 302. Also, as discussed above these specific security policies can be based on many different device parameters. For example, one user device parameter could be the type of user device itself. For example, a particular computer (e.g. 306) may have security requirements that differ from another device, such as a smart factory 312. In addition, security requirement of a device can vary based on the application being used by a particular device, even as compared with other similar devices. For example, a particular computer user device 202 may handle sensitive data such as payroll or medical data, whereas another similar computer device 306 may be used to store or process less sensitive data, such as publicly available data and would not require the same full suite of security services as the computer 202. As another example, a fleet of autonomous vehicles might have a need to communicate various data to other vehicles and even devices and vehicles outside of the enterprise networking environment 302. In this case, applying certain security protocols that might be appropriate for other devices or applications could hinder this type of communication. Therefore, it can be seen that the security needs of various devices within the enterprise network can vary greatly depending upon various user device parameters.

As described above, the user device (e.g. 202) receives security policy from the security policy agent 204, wherein the security policy is based on one or more user parameters, which can include: the user device; application; user group; etc. The user device 202 sends a data packet 210 including metadata 212 to the security service 206, which in one embodiment can be a Secure Access Service Edge (SASE) security service. In one embodiment, the metadata can include a packet header that can include a label stack indicating security requirements as described above.

Figure 4:
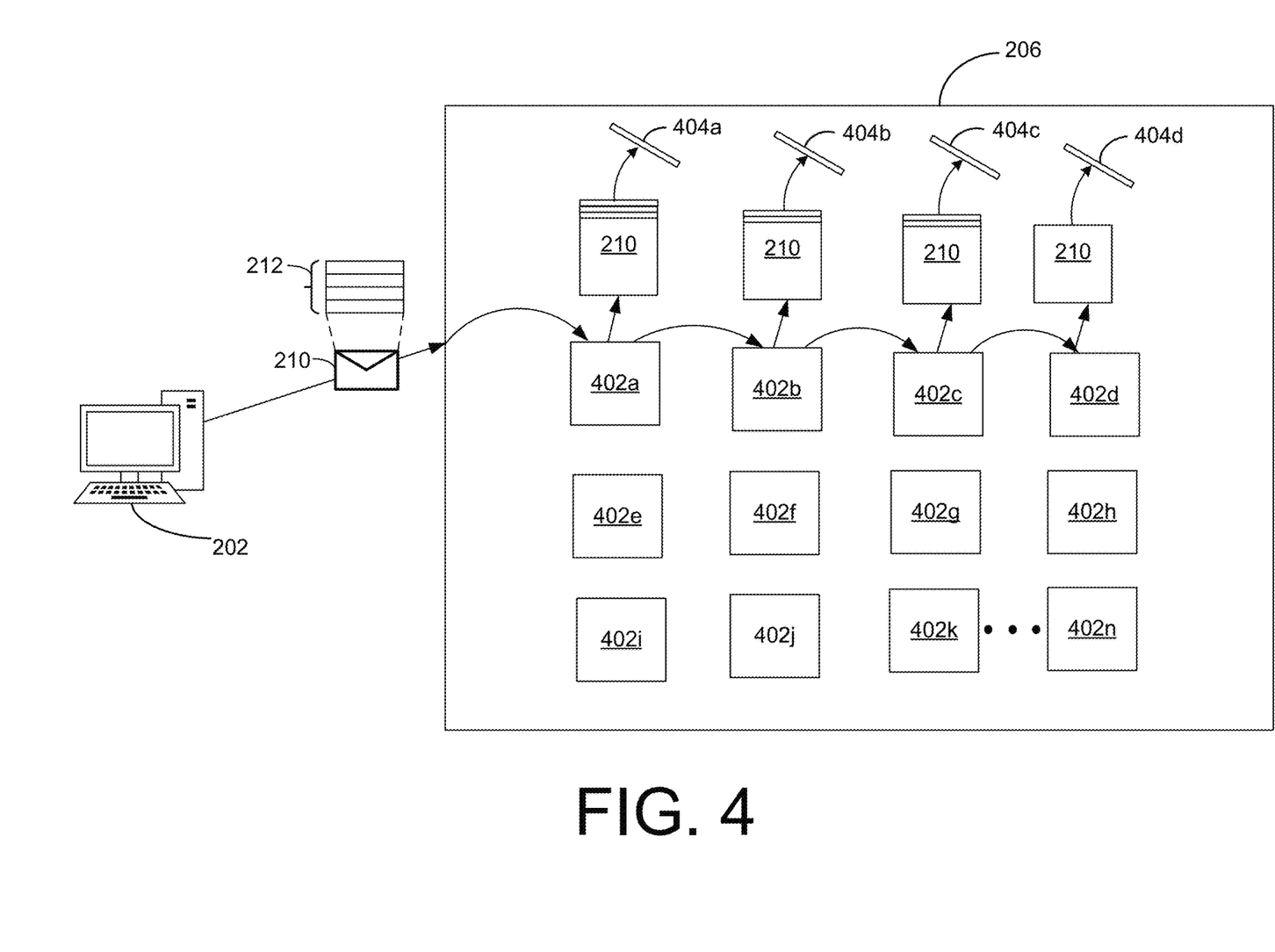
FIG. 4 is a schematic illustration of a computing system sending a data packet having metadata indicating selected security services to a cloud-based security software provider, wherein individual headers are removed as each associated security service is applied.

FIG. 4 illustrates a data packet 210 implementing selected security services 402 of a security service suite 206, which in some embodiments can be a SASE service 206. As mentioned above, the data packet from the user device 202 can include metadata 212 indicating which security services 210 to implement. In one embodiment, the metadata 212 can include a header having a label stack, wherein each label of the stack represents a particular security service to apply. As shown in FIG. 4, as each security service 402 is implemented, an associated label 404 can be removed (popped oft) indicating that the particular security service has been implemented.

In one embodiment, the labeled data packet 210, can operate in a Multiprotocol Label Switching (MPLS) network technology that routes traffic using the shortest path based on the header 212 and labels 404, rather than network addresses, to handle forwarding over private wide area networks such as the security suite (e.g. SASE security service) 206. For example, MPLS enables enterprises and service providers to build networks that deliver a wide variety of services over a single infrastructure. This provides an economical solution to packet routing that can be integrated seamlessly over an existing infrastructure, such as IP, Frame Relay, ATM or Ethernet. Subscribers with differing access links can be aggregated on an MPLS edge without changing their current environments, since MPLS is independent of access technologies. This MPLS networking technology can use the various individual labels (for example labels 404a-d) to access and apply the desired security services 402a-d from the security service suite 206, even in an edge computing environment, wherein the security services 402 may be provided by different servers or devices which may be located in different physical locations.

Figure 5:
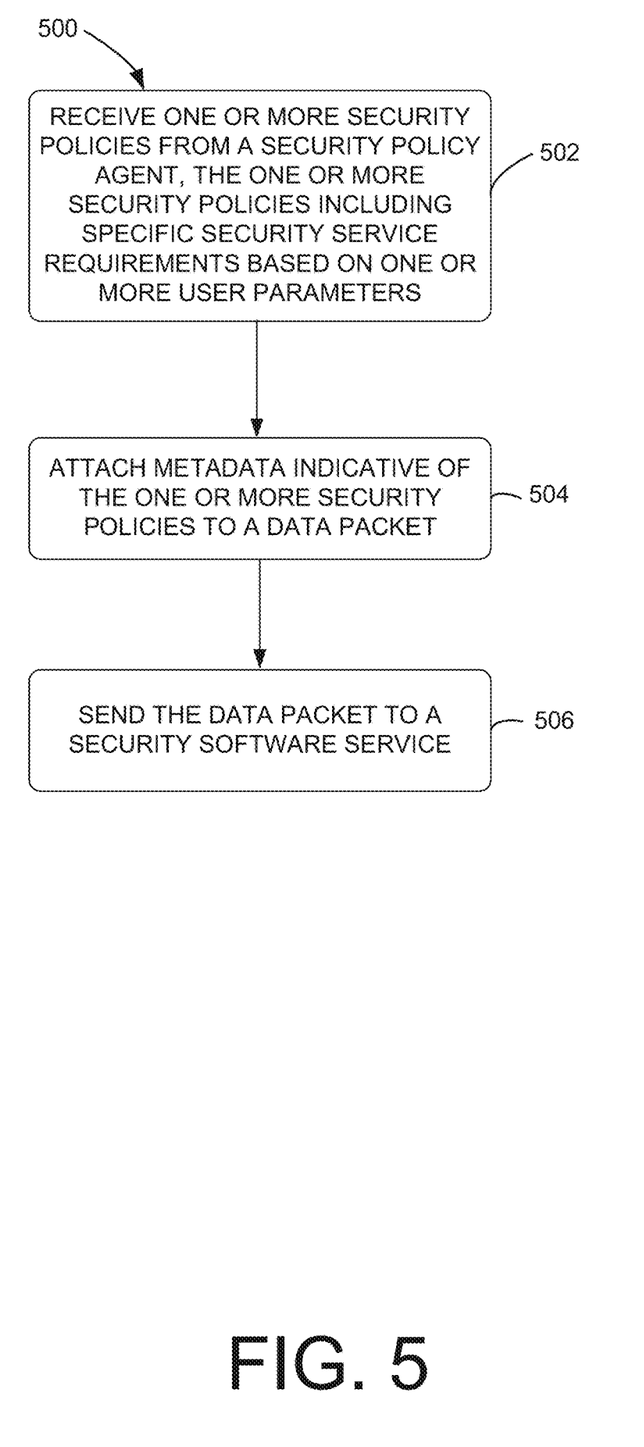
FIG. 5 is a flowchart of a method according to an embodiment.
Figure 6:
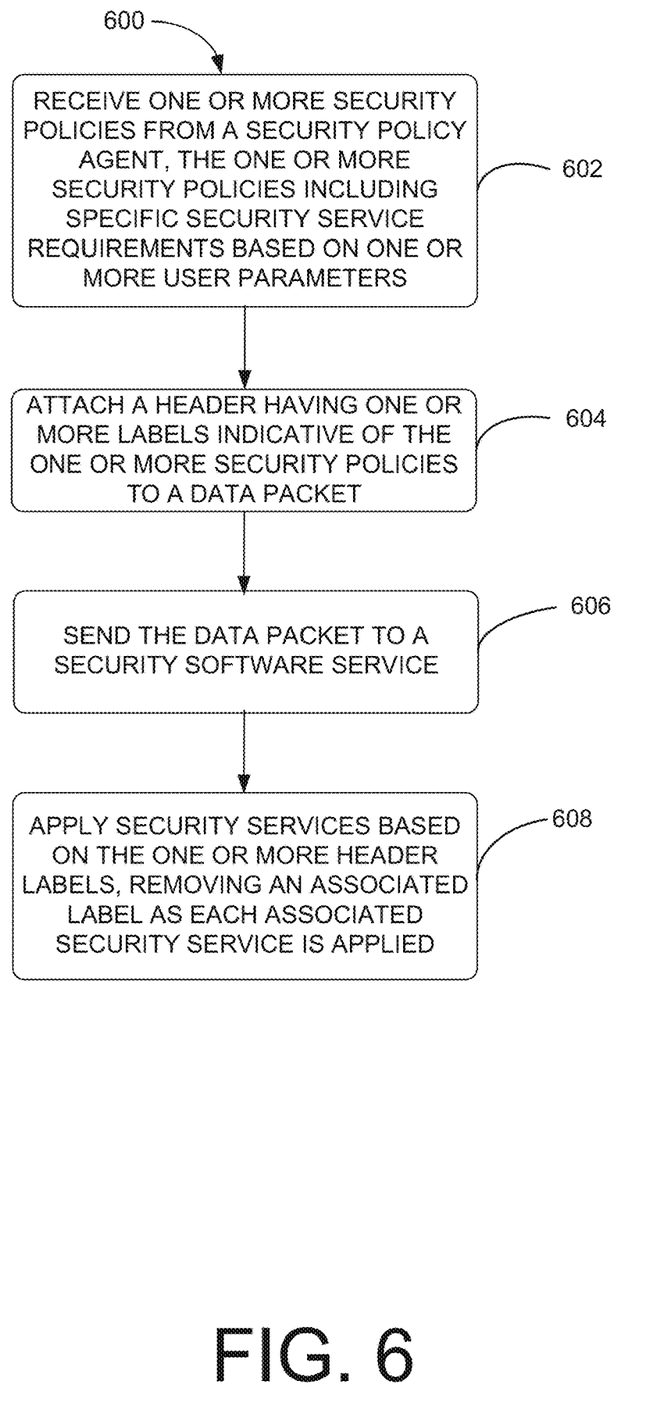
FIG. 6. is a flowchart of a method according to another embodiment.
Figure 7:
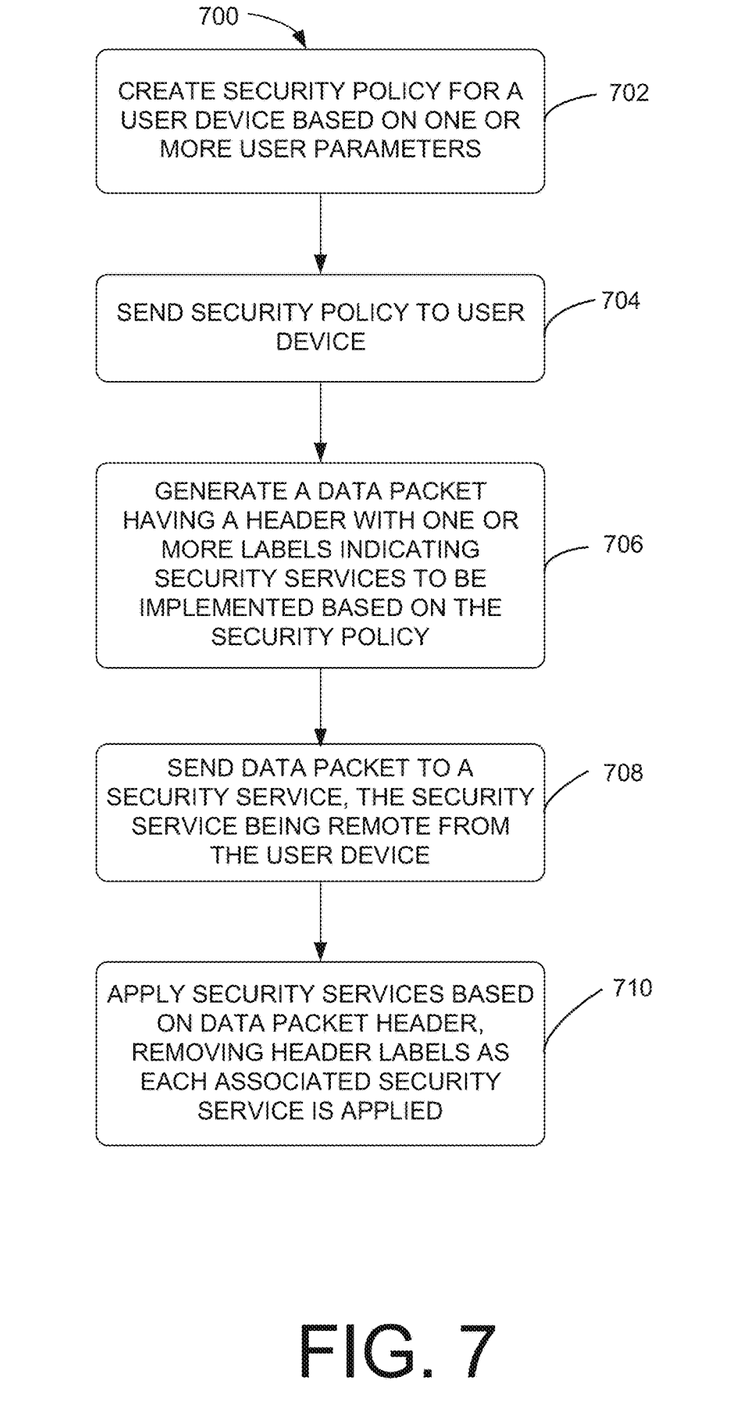
FIG. 7 is a flowchart of a method according to yet another embodiment.

FIGS. 5-7 are flow diagrams illustrating example methods associated with the techniques described herein. The logical operations described herein with respect to FIGS. 5-7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 5-7 and described herein. These operations can also be performed in parallel, or in a different order than those described herein. Some or all of these operations can also be performed by components other than those specifically identified. Although the techniques described in this disclosure are described with reference to specific components, in other examples, the techniques may be implemented by less components, more components, different components, or any configuration of components.

FIG. 5 is a flow diagram illustrating an example method 500 for providing cloud-based security services. The method 500 includes receiving one or more security policies from a security policy agent 502, wherein the one or more security policies include specific security service requirements based on one or more user parameters. In one embodiment, the one or more user parameters can include: a user device, an application, and/or a user group. In one embodiment, the one or more security policies can be security services to be accessed by a cloud-based security service. In one embodiment, the cloud-based security services can be a Secure Access Service Edge (SASE) security service. Metadata indicative of the security policies is attached to a data packet 504. In one embodiment, the metadata can include a data packet header including a label stack, wherein each label is indicative of a security service or policy to be employed. The data packet is sent to a security software service 506. In one embodiment, the security service is a cloud-based security service. In one embodiment, the cloud-based security service is a Secure Access Service Edge (SASE) security service.

FIG. 6 is a flowchart illustrating a method 600 for implementing selected security services according to another embodiment. One or more security policies are received from a security policy agent, the one or more security policies including specific security policies and security service requirements based on one or more user parameters 602. In one embodiment, the security policies can be received by a user device. In one embodiment, the user device and the security policy agent are associated with a common enterprise network. In one embodiment, the user parameters can include one or more of a user device, application and/or user group. A header having one or more labels indicative of the one or more security policies is attached to a data packet 604. The data packet is sent to a security software service 606. In one embodiment, the software service is a cloud-based security service. In one embodiment, the security service is a Secure Access Service Edge (SASE) security service. Security services are applied based on the one or more header labels, and associated labels are removed as each associated security service is applied 608.

Figure 8:
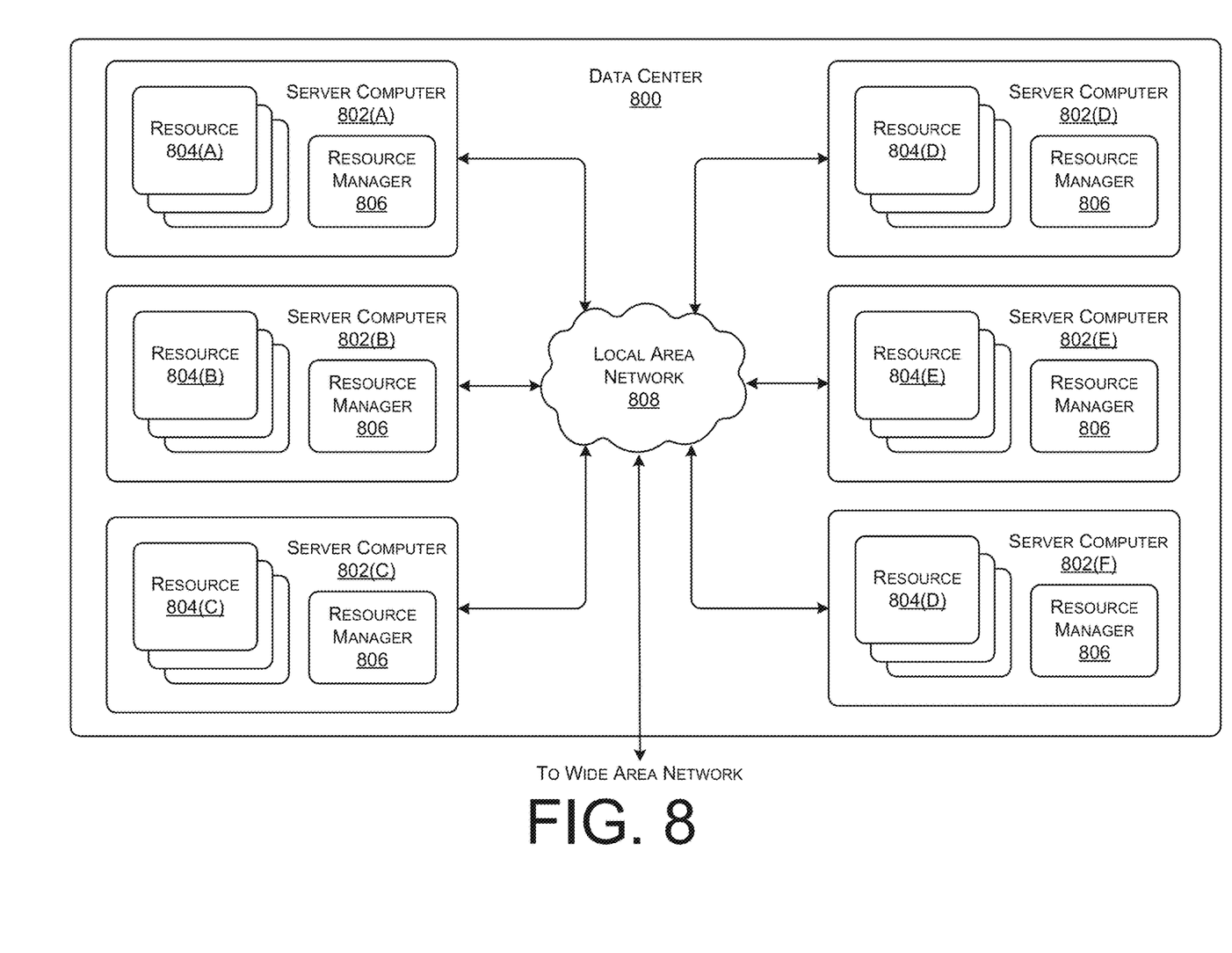
FIG. 8 is a computing system diagram illustrating an example configuration of a data center that can be utilized to implement aspects of the technologies disclosed herein.

FIG. 7 is a flowchart illustrating a method 700 according to another embodiment. In the method 700, a security policy is created for a user device based on one or more user parameters. In one embodiment, the security policy can be created by a security policy agent. In one embodiment, the security policy agent and the user devices can be part of a common enterprise network. In one embodiment, the user parameters can include one or more of a user device, a user group, and/or user application. The created security policy is sent to the user device 704. A data packet is created having a header with one or more labels indicating security services to be implemented based on the security policy 706. In one embodiment, the data packet is generated by the user device based on the received security policies, which in one embodiment can be received from the security policy agent. The data packet is sent to a cloud based security service 708. In one embodiment, the cloud-based security service can be a Secure Access Service Edge (SASE) security service. In one embodiment, the SASE security service can be a cloud-based security services with security services being located in different physical locations in a cloud-computing environment. Security services are applied based on the data packet header, wherein a header label corresponding to a particular security service is removed as each associated security service is applied 710, FIG. 8 is a computing system diagram illustrating an example configuration of a data center 800 that can be utilized to implement aspects of the technologies disclosed herein. The example data center 800 shown in FIG. 8 includes several server computers 702A-802F (which might be referred to herein singularly as "a server computer 802" or in the plural as "the server computers 802") for providing computing resources. In some examples, the resources and/or server computers 802 may include, or correspond to, any type of networked, devices or nodes described herein. Although described as servers, the server computers 802 may comprise any type of networked device, such as servers, switches, routers, hubs, bridges, gateways, modems, repeaters, access points, etc. In one embodiment, one or more of the server computers can correspond to computer device 102 of FIG. 1, wherein a security policy agent 104 can be implemented.

The server computers 802 can be standard tower, rack-mount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, security, packet inspection, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate local area network (LAN) 808 is also utilized to interconnect the server computers 802A-802F. In one embodiment, the local area network 808 can correspond to the domain 124 described above with reference to FIG. 1. In one embodiment, the local area network can correspond to enterprise network 302 described above with reference to FIG. 3. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It should be appreciated that the configuration of the data center 800 described with reference to FIG. 8 is merely illustrative and that other implementations can be utilized.

In some examples, the server computers 802 may each execute one or more application containers and/or virtual machines to perform techniques described herein. In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like. The computing resources 804 may be utilized to run instances of secure access nodes or other workloads.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, secure access points, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations. One illustrative embodiment for a data center 800 that can be utilized to implement the technologies disclosed herein will be described below with regard to FIG. 9.

Figure 9:
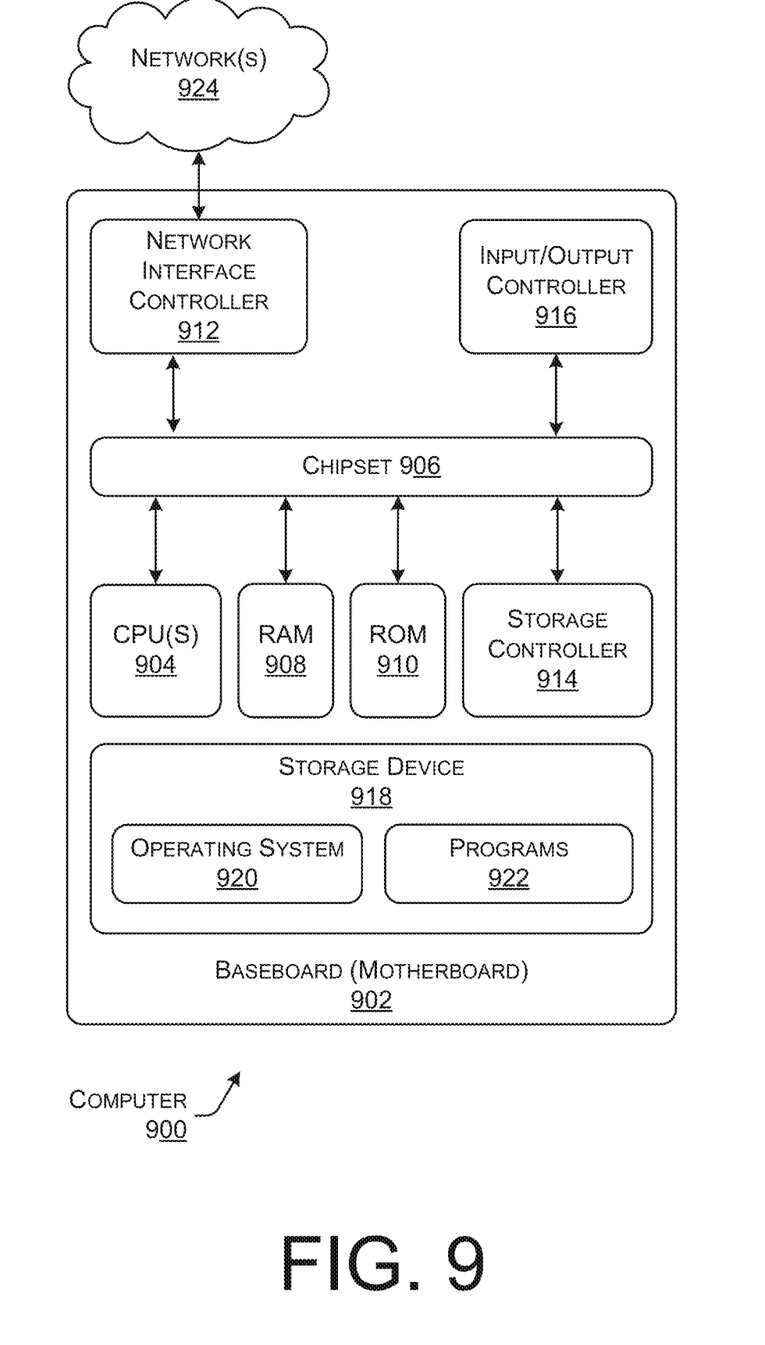
FIG. 9 is a computer architecture diagram showing an illustrative computer hardware architecture that can be utilized to implement aspects of the various technologies presented herein.

FIG. 9 is a computer architecture diagram showing an illustrative computer hardware architecture that can be utilized to implement aspects of the various technologies presented herein. The computer architecture shown in FIG. 9 illustrates a conventional server computer, network node, router, workstation, desktop computer, laptop, tablet, network appliance, e-reader, smartphone, load balancer, edge device, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900. In one embodiment, the computer 900 can correspond with the user device 106, or computer device 102 of FIG. 1. In one embodiment, the computer 900 can correspond with the user device 202 of FIGS. 2 and 3.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the networks) 924 (e.g., the internet), the cloud-computing network, the enterprise network 202 (FIG. 2), constituent networks, or the like. The chipset 906 can include functionality for providing network connectivity through a NIC 912, such as a gigabit Ethernet adapter. The NIC 912 is capable of connecting the computer 900 to other computing devices over the network 924. It should be appreciated that multiple NICs 912 can be present in the computer 900, connecting the computer to other types of networks and remote computer systems. In some examples, the NIC 912 may be configured to perform at least some of the techniques described herein.

The computer 900 can be connected to a storage device 918 that provides non-volatile storage for the computer. The storage device 818 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the architectures 302 of FIG. 3 and or any components included therein, may be supported by one or more devices similar to computer 900. Stated otherwise, some or all of the operations performed by the architecture 302, and or any components included therein, may be performed by one or more computer devices 900 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes and functionality described above with regard to FIGS. 1-7, and herein. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

The computer 900 may include one or more hardware processors (processors) configured to execute one or more stored instructions. The processor(s) may comprise one or more cores. Further, the computer 900 may include one or more network interfaces configured to provide communications between the computer 900 and other devices. The network interfaces may include devices configured to couple to personal area networks (PANS), wired and wireless local area networks (LANs), wired and wireless wide area networks (WANs), and, so forth. For example, the network interfaces may include devices compatible with Ethernet, Wi-Fi™ and so forth.

The programs 922 may comprise any type of programs or processes to perform the techniques described in this disclosure for operationalizing workloads at edge network nodes, while maintaining centralized intent and policy controls in a cloud-computing network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for implementing cloud-based security protocols for a user device, the method comprising:
   receiving, at a cloud-based service, group policy objects (GPOs) that indicate a plurality of security services for network flows based on one or more parameters associated with the network flows;
   receiving, at the cloud-based service, a data packet of a network flow sent from a user device;
   identifying metadata in the data packet that indicates the parameters associated with the network flow; and
   determining, that the parameters in the metadata of the packet correspond to a particular GPO that indicates security services of the plurality of security services that are to be applied to the network flow; and
   sending the network flow to the one or more security services.

2. The method of claim 1, wherein the GPOs are based on one or more of a user device, user group, or application.

3. The method of claim 1, wherein the security services comprise secure access service edge security.

4. The method of claim 1, wherein the GPOs are received by a user device and the cloud-based service is remote from the user device.

5. The method of claim 1, wherein the metadata indicative of the GPOs comprises one or more headers attached to the data packet.

6. The method as in claim 1, wherein the GPOs generated via one or more of Group Policy Object (GPO) or Mobile Device Management (MDM) policy.

7. The method as in claim 5, wherein the one or more headers can be removed when an associated security service has been applied.

8. A computer system, comprising:
one or more processors; and
one or more non-transitory computer-readable media storing instructions that, when executed by the one or more processors, cause the one or more processors to perform operations comprising:
receiving, at a cloud-based service, group policy objects (GPOs) that indicate a plurality of security services for network flows based on one or more parameters associated with the network flows;
receiving, at the cloud-based service, a data packet of a network flow sent from a user device;
identifying metadata in the data packet that indicates the parameters associated with the network flow; and
determining, that the parameters in the metadata of the packet correspond to a particular GPO that indicates security services of the plurality of security services that are to be applied to the network flow; and
sending the network flow to the one or more security services.

9. The computer system as in claim 8, wherein the GPOs are based on one or more of a user device, user group, or application.

10. The computer system as in claim 8, wherein the security services comprise secure access service edge security.

11. The computer system as in claim 8, wherein the GPOs are received by a user device and the cloud-based service is remote from the user device.

12. The computer system as in claim 8, wherein the metadata indicative of the GPOs comprises one or more headers attached to the data packet.

13. The computer system as in claim 12, wherein the one or more headers can be removed when an associated security service has been applied.

14. The computer system as in claim 8, wherein the GPOs generated via one or more of Group Policy Object (GPO) or Mobile Device Management (MDM) policy.

15. A method performed by a controller on a user device, the method comprising:
receiving, at a cloud-based service, group policy objects (GPOs) that indicate a plurality of security services for network flows based on one or more parameters associated with the network flows;
receiving, at the cloud-based service, a data packet of a network flow sent from a user device;
identifying metadata in the data packet that indicates the parameters associated with the network flow; and
determining, that the parameters in the metadata of the packet correspond to a particular GPO that indicates security services of the plurality of security services that are to be applied to the network flow; and
sending the network flow to the one or more security services.

16. The method as in claim 15, wherein the GPOs are based on one or more of a user device, user group, or application.

17. The method as in claim 15, wherein the security services comprise secure access service edge security.

18. The method as in claim 15, wherein the metadata indicative of the GPOs comprises one or more headers attached to the data packet.

19. The method of claim 1, wherein the metadata indicates a set of tags that each correspond to individual ones of the plurality of security services,
further comprising iteratively removing each tag of the set of tags as an associated security service has been applied to the network flow.

20. The method of claim 1, further comprising:
joining, by the user device, a domain;
receiving, at the user device, an indication of the security services of the plurality of security services that are to be applied to network flows from the user device and based at least in part on the domain; and
populating, by the user device, the data packet of the network flow with the metadata.

* * * * *